June 6, 1950 A. G. CLAVIER ET AL 2,510,075

MODULATOR OF THE DRY TYPE

Filed June 13, 1947 2 Sheets-Sheet 1

INVENTORS
ANDRÉ G. CLAVIER
MARCEL DENIS
BY Robert Harding Jr.
ATTORNEY

June 6, 1950 A. G. CLAVIER ET AL 2,510,075

MODULATOR OF THE DRY TYPE

Filed June 13, 1947 2 Sheets-Sheet 2

INVENTORS
ANDRE G. CLAVIER
MARCEL DENIS
BY Robert Harding Jr.
ATTORNEY

Patented June 6, 1950 2,510,075

UNITED STATES PATENT OFFICE 2,510,075

MODULATOR OF THE DRY TYPE

André G. Clavier and Marcel Denis, Paris, France, assignors to International Standard Electric Corp., New York, N. Y., a corporation of Delaware Application June 13, 1947, Serial No. 754,571
In France July 15, 1939

Section 1, Public Law 690, August 8, 1946
Patent expires July 15, 1959

6 Claims. (Cl. 332—47)

Figure 1:
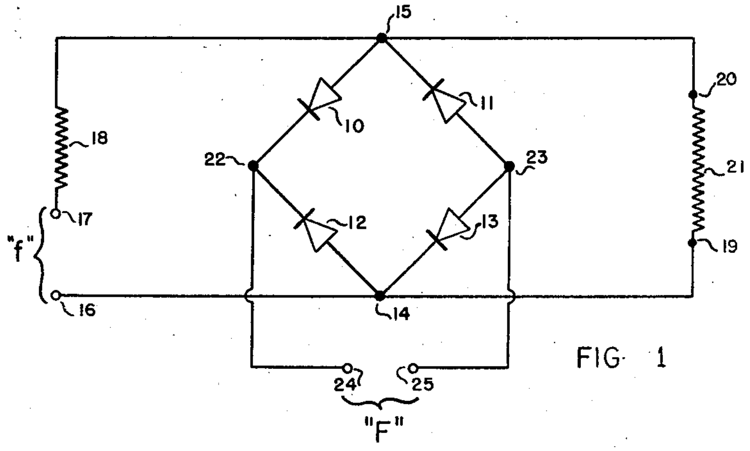

This invention relates to system of transmission of electrical waves and more particularly to a carrier current signaling system of which units or bridges of uni-directional elements are provided in order to supply to a utilization circuit a current of which the frequency is a result of the interaction of the current supplied by a source of modulating frequency on a current of carrier frequency. The two currents being respectively applied to the two diagonals of the bridge of uni-directional elements, which will be designated in the following disclosure as modulator devices so as to simplify the explanation, although it will be seen that they can also be used as demodulators.

The uni-directional elements usually employed in these systems consist of dry rectifiers having an ordinary conductivity according to the direction of the potential which is applied to their terminals. If this potential be alternating and of frequency F, the resistance of the rectifier passes to the same frequency of a very low value for one direction of the potential to a very high and practically infinite value for the opposite direction.

This property is ordinarily employed to transfer to a high frequency, for example, F—f, a potential taken at lower frequency f. In order to have a normal operation of the modulating device it is necessary for the low frequency modulating potential f to be small with respect to the carrier potential at frequency F.

In such systems there is an optimum value of utilization resistance which depends upon the characteristics of the rectifiers employed in the bridge of the modulator. This value gives a maximum output of the system, its output being defined as the ratio of the power dissipated in the utilization (at the desired frequency) to the power supplied by the source of frequency f.

However, for this optimum value of the utilization resistance the output of the system may be reduced on account of imperfections due to the rectifiers of the bridge. In practice these imperfections may be considered as capacity effects and the whole effect is as for capacities in shunt on the ohmic resistances of the rectifiers.

It is an object of the invention to provide in a carrier current signaling system of the class set forth, means for eliminating the capacity effects due to imperfections of the rectifiers of the bridge, thereby increasing the output thereof while introducing no appreciable disturbance with regard to the action of the modulating frequency.

Another object of the invention is to provide in a carrier current signaling system of the class set forth, correcting means to substantially correct the shunt effect of the interference capacities of the rectifiers at the frequencies F—f without impairing the rectifier action of the elements.

A further object of the invention is to provide in a carrier current signaling system of the class set forth, one or a plurality of anti-resonance circuits of which the tuning takes into consideration the interference capacities of the elements of the rectifier without short circuiting the utilization impedance at the frequency f.

Another object of the invention is to provide in a carrier current signaling system of the class set forth, a plurality of uni-directional conducting devices, a plurality of alternating current generators, and a load circuit, characterized in that imperfections in the uni-directional conducting devices represented by leakage capacity in parallel are compensated by one or more tuned circuits.

A further object of the invention is to provide in a carrier current signaling system of the class set forth, a plurality of dry rectifier elements connected to form a bridge circuit, wherein the imperfections in the rectifier elements represented by leakage capacity in parallel are compensated by one or more circuits tuned to the frequency or frequencies required in the load circuit.

Another object of the invention is to provide in a carrier current signaling system of the class set forth a tuned circuit shunted across the load circuit so that on the one hand the anti-resonance circuit is a constant impedance in the whole range of modulating frequencies, and on the other hand this impedance combined with the interference capacity inherent in the rectifier elements, remains sufficiently high to be negligible in the whole extent of this range of frequencies.

Other and further objects and advantages of the invention will be hereinafter set forth and the novel features thereof defined by the appended claims.

For a better understanding of the invention, reference may be had to the accompanying drawings.

Referring more particularly to Fig. 1, there is shown a rectifier bridge comprised of four rectifier elements 10, 11, 12, and 13. The terminals 14 and 15 comprise the input to one diagonal of the bridge circuit and connect to the terminals 16 and 17, respectively, which represent the source of modulating frequency f indicated in series with the internal resistance of the source and the resistance of the line 18. The terminals 14 and 15 also connect to the terminals 19 and 20 respectively which comprise the utilization circuit. The resistance 21 represents the impedance of the utilization circuit. The terminals 22 and 23 comprise the input to the second diagonal of the bridge circuit and are connected to the terminals 24 and 25, respectively, which terminals connect to a source of carrier frequency F.

Figure 2:
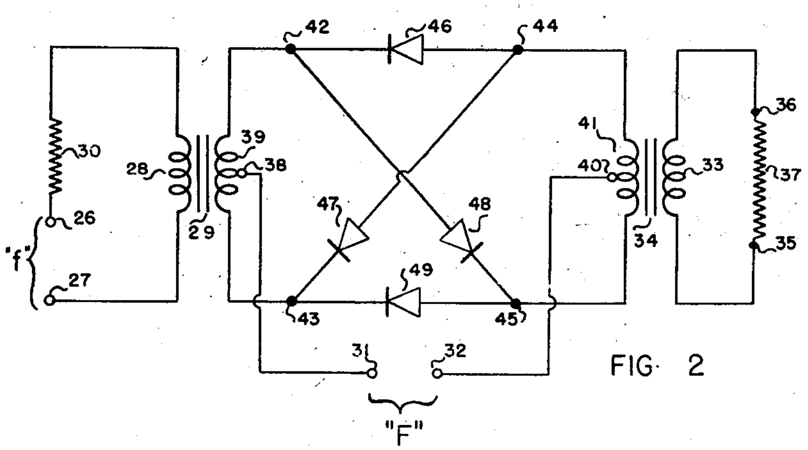

In Fig. 2 the source of modulating frequency $f$ is connected to the terminals 26 and 27 which in turn are connected to the primary winding 28 of an input transformer 29. The resistance 30 represents the internal resistance of the source and the resistance of the line. The source of carrier frequency F is connected to the terminals 31 and 32. The secondary winding 33 of the output transformer 34 is connected to the external utilization circuit by the terminals 35 and 36. The resistance 37 represents the impedance of the utilization circuit. A tap 38 on the secondary winding 39 of the input transformer 29 is connected to the terminal 31, and a tap 40 on the primary winding 41 of the output transformer 34 is connected to the terminal 32. The secondary winding 39 of the input transformer 29 has one end connected to a terminal 42 and the other end connected to a terminal 43. The terminals 42 and 43 are the input terminals of the rectifier bridge. The primary winding 41 of the output transformer 34 has one end connected to a terminal 44 and the other end connected to a terminal 45. The terminals 44 and 45 are the output terminals of the rectifier bridge. The rectifier elements 46, 47, 48, and 49 make up the bridge circuit, which in this case are connected in such a manner as to operate as a phase inverter, and which circuit is well known in the prior art.

Figure 3:
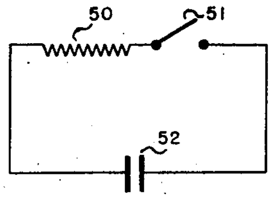

Referring to Fig. 3, the schematic showing represents the electrical equivalent of the rectifiers in Figs. 1 and 2, and wherein a pure resistance in series with an interrupter 51 is shunted by the interference capacity 52, inherent in the rectifier elements.

Figure 4:
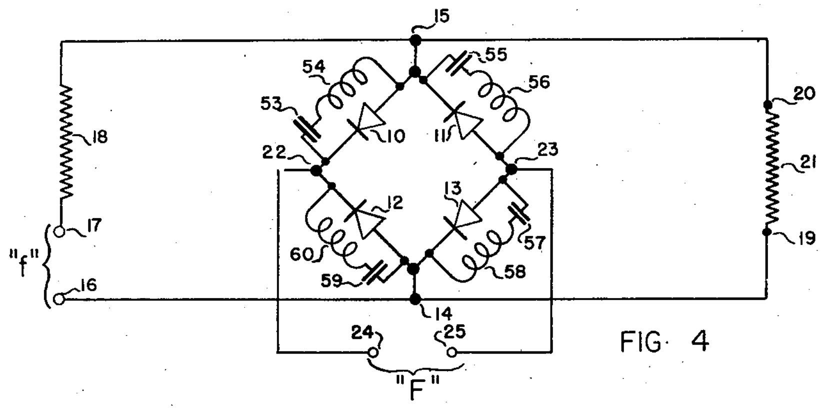

Fig. 4 shows an example wherein tuned circuits are shunted with the rectifier elements of the bridge described in Fig. 1. A condenser 53 and an inductor 54 are connected in series and shunted with the rectifier element 10. Similar shunt circuits are provided for each of the rectifier elements as follows: A condenser 55 and an inductor 56 shunted with the rectifier element 11, a condenser 57 and an inductor 58 shunted with the rectifier element 13, a condenser 59 and an inductor 60 shunted with the rectifier element 12.

Figure 5:
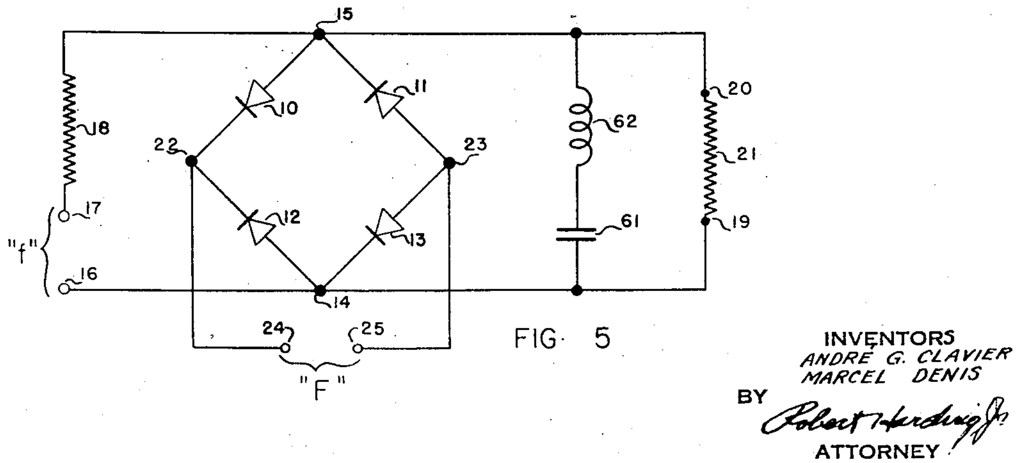

Fig. 5 shows an example wherein a common tuned circuit, comprised of a condenser 61 and an inductor 62 is placed in shunt with the utilization circuit impedance 21.

Figure 6:
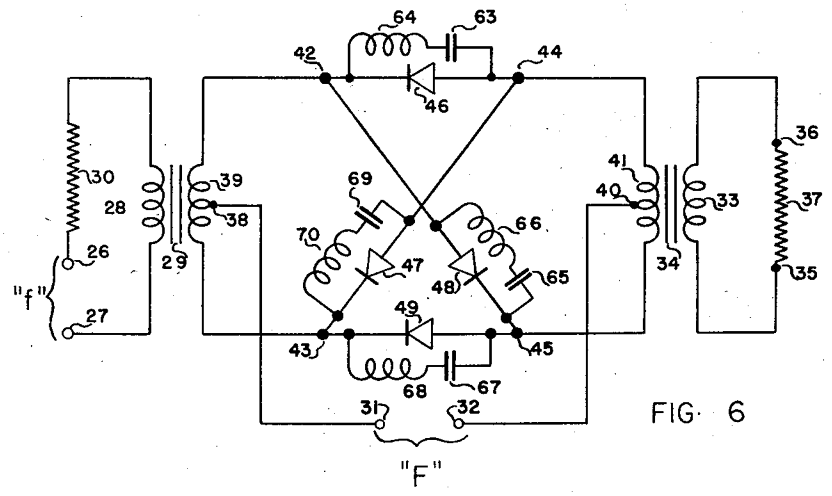

Fig. 6 shows a phase inversion circuit arrangement as described for Fig. 2 and wherein tuned circuits are connected in shunt with the rectifier elements of the bridge circuit. A condenser 63 is connected in series with an inductor 64 and shunted with the rectifier element 46. Similar shunt circuits are provided for each of the rectifier elements as follows: A condenser 65 and an inductor 66 shunted with the rectifier element 48, a condenser 67 and an inductor 68 shunted with the rectifier element 49, a condenser 69 and an inductor 70 shunted with the rectifier element 47.

In the system of signaling by carrier current employed in practice, two main modulator circuits are employed. These two main circuits as shown schematically in Figs. 1 and 2 in which $f$ represents the source of modulating frequency indicated in series with the internal resistance of the source and the resistance of the line 18. The modulator bridge comprising the rectifier elements 10, 11, 12, and 13 are connected, as heretofore described, to the input and output circuits and a carrier frequency source F is connected to an opposite diagonal of the bridge. The frequencies $f$ and F coact to form a composite utilization current across the impedance 21. Fig. 1 shows a modulator operating by cut-off, that is, the rectifier bridge operates substantially as an interrupter alternately connecting and disconnecting a resistance (the ohmic resistance of the rectifiers in the conducting direction) in shunt on the utilization impedance 21.

In the diagram of Fig. 2 there is shown a modulator operating on the principal of phase inversion and wherein the transformers 29 and 34 are included in the bridge circuit, this circuit is well known in the prior art. Whatever type of modulator employed, the total potential collected on the utilization terminals 19 and 20 appears as a sum of partial potentials having the frequencies included in the general expression $nF \pm mf$, $m$ and $n$ being whole numbers. The output of a modulator of this kind may be defined as the quotient of the power collected on the terminals 19 and 20 at the frequency F—$f$ by the power supplied from the modulating source to the terminals 16 and 17.

Calculations show that this output passes through a maximum for an optimum value of the utilization resistance 21 if the rectifiers may be considered perfect, that is, as pure resistance.

In practice the rectifiers must be considered in the electrically equivalent form shown in Fig. 3, i. e., as a pure resistance 50 in series with an interrupter 51, the unit being shunted by an interference capacity 52.

It is therefore of importance to provide means for utilizing the effect of such interference capacities. These correcting means must substantially correct the shunt effect of the interference capacities of the rectifiers at the frequency F—$f$ without impairing the rectifier action of the elements.

The invention comprises the use of anti-resonance circuits of which the tuning takes into consideration the interference capacities of the imperfect elements of the bridge rectifier. An anti-resonance circuit of this kind cannot merely consist in the addition of an inductance in shunt between the utilization terminals 19 and 20 of Fig. 5 or on each of the rectifier elements as in Fig. 4 because it will constitute a short circuit of the utilization impedance at the modulating frequency $f$.

The invention consequently provides, in accordance with one of its aspects shown schematically in Fig. 4 the use in shunt with each of the elements 10, 11, 12, and 13, of the bridge of a special circuit ensuring anti-resonance with the capacity of the element so as practically to eliminate the effect of this capacity at the frequency F—$f$ without short circuiting the utilization impedance at the frequency $f$.

Fig. 4 shows an example of use in shunt on each element of the rectifier bridge of a simply constructed circuit carrying out the object of the invention. This circuit is composed of an inductance in series with a capacity. Although the circuit of Fig. 4 relates to the modulator arrangement indicated in Fig. 1 it is clear that such circuits may be employed with a modulator arrangement such as indicated in Fig. 2. This is the arrangement shown in Fig. 6.

A circuit of this kind ensuring anti-resonance of the interference capacities of the bridge cannot moreover be directionally associated with each element but the capacities of these elements may enter en bloc in a general anti-resonance circuit 61 and 62 which neutralizes them as desired. A circuit of this kind can be then placed in shunt with the utilization resistance 21 as shown in Fig. 5. In this figure, which corresponds to the modulator arrangement of Fig. 1, this circuit is shown in its simplest form, i. e., comprising an inductance in series with a capacity. The same arrangement can be adapted for the modulator arrangement of Fig. 2, provided however that the resistance of the rectifier in the conducting direction is small with respect to the impedance 21 and the impedance offered by the interference capacity at the modulation frequency $f$.

As mentioned above, carrier current signaling systems do not employ a single modulating frequency $f$ but a frequency band and correcting devices of the invention have to ensure the utilization of the interference capacity of the bridge of rectifiers in the whole range employed without introducing appreciable distortion for all the modulation frequencies comprised in this range. This result is obtained in accordance with another characteristic of the invention, by dimensioning the elements of the corrector circuit so that on the one hand the anti-resonance circuit is a constant impedance in the whole range of modulating frequencies, and on the other hand this impedance combined with the interference capacity remains sufficiently high to be negligible in the whole extent of this range of frequencies.

It should, however, be understood that although the invention has been shown in a simple form of anti-resonance circuit in two usual embodiments of a carrier current signaling system, this circuit may be of more complicated form which may be based on other considerations not forming a part of the present invention, for example, for conditions of balancing the bridge and suppression of harmonics in the output, etc.

In the same way, resonance circuits of this kind may be employed in all circuits comprising a rectifier bridge fed by one diagonal with a current or series of impulses of a certain frequency, and by its other diagonal with a current or series of impulses of another frequency, the output being of a frequency resulting from the desired combination of the two applied frequencies, different sums or combinations of harmonics.

While but one form of the invention has been shown and described herein, it will be readily apparent to those skilled in the art that various minor modifications may be made without departing from the spirit of the invention or the scope of the appended claims.

What is claimed as new and desired to be secured by Letters Patent of the United States, is:

1. A carrier current signaling system comprising a plurality of unidirectional conducting elements connected to form a modulator having two pairs of input terminals, a first input circuit connected to one pair of said input terminals, a second input circuit connected to the remaining pair of input terminals, an output utilization circuit, a modulating frequency source connected to the first input circuit, a carrier current source connected to the second input circuit, and a tuned circuit comprising elements coupled to said system intermediate the input circuits and the output utilization circuit, said elements being tuned with the inherent interference capacities of the uni-directional conducting elements for increasing the output current of the system.

2. A carrier current signaling system comprising a plurality of uni-directional conducting elements connected to form a bridge rectifier having two pairs of input terminals, a first input circuit connected to one pair of said input terminals, a second input circuit connected to the remaining pair of input terminals, an output utilization circuit, a modulating frequency source connected to the first input circuit, a carrier current source connected to the second input circuit, and a tuning circuit coupled intermediate the input circuits and the output utilization circuit for tuning with the inherent interference capacities of the uni-directional conducting elements for increasing the output current of the system.

3. A carrier current signaling system comprising a plurality of uni-directional conducting elements connected to form a bridge rectifier having two pairs of input terminals, a first input circuit connected to one pair of said input terminals, a second input circuit connected to the remaining pair of input terminals, a modulating frequency source connected to the first input circuit, a carrier current source comprising elements connected to the second input circuit, an output utilization circuit coupled to said bridge rectifier for obtaining selected modulation products of the outputs of said modulating source and said carrier source, a tuned circuit connected in shunt with the output utilization circuit and the inherent interference capacities of the uni-directional conducting elements, the elements of said tuned circuit having dimensions whereby said tuned circuit has a substantially constant impedance over the range of modulating frequencies, while minimizing the shunting effect of the interference capacities at the frequency of the selected modulation products, thereby increasing the output current of the system.

4. A carrier current signaling system comprising a plurality of uni-directional conducting elements connected to form a modulator operating by phase inversion, an input transformer having a primary winding and a secondary winding, an output transformer having a primary winding and a secondary winding, a center tap on the secondary winding of the input transformer, a center tap on the primary winding of the output transformer, the secondary winding of the input transformer connected to the input of the modulator, the output of the modulator connected to the primary winding of the output transformer, a carrier frequency source connected to the center taps on the transformer windings, a modulating frequency source connected to the primary winding of the input transformer, and a plurality of tuning circuits each comprising a condenser and an inductor, one of said tuning circuits being connected in shunt with each of said uni-directional conducting elements, each of the tuning circuits being of such value as to neutralize the inherent interference capacities of the uni-directional conducting elements, thereby increasing the output current of the system.

5. In a two diagonal bridge modulator arrangement comprising rectifier elements having electrodes, and wherein a source of carrier signals is coupled to one diagonal and a source of modulating signals is coupled to another diagonal for mixing with said carrier signals to provide mixed signals, means for minimizing the interelectrode capacitance of said elements comprising tuning circuits coupled across each of said elements, said tuning circuits each comprising elements adjusted to tune with the interelectrode capacitance of a respective rectifier element to the frequency of said mixed signals.

6. In arrangement according to claim 5, wherein said tuning circuits comprise a series inductance and capacitance coupled across each of said rectifier elements.

ANDRÉ G. CLAVIER.
MARCEL DENIS.

REFERENCES CITED

The following references are of record in the file of this patent:

UNITED STATES PATENTS

| Number | Name | Date |
|---|---|---|
| 2,152,016 | Baesecke et al. | Mar. 28, 1939 |

FOREIGN PATENTS

| Number | Country | Date |
|---|---|---|
| 113,470 | Australia | July 9, 1941 |
| 537,731 | Great Britain | July 3, 1941 |